US011388987B1

(12) United States Patent
Montano et al.

(10) Patent No.: US 11,388,987 B1
(45) Date of Patent: Jul. 19, 2022

(54) ELECTROSTATIC BODILY PARTICLE COLLECTION DEVICE

(71) Applicant: Kenneth Montano, Albuquerque, NM (US)

(72) Inventors: Kenneth Montano, Albuquerque, NM (US); Avni Alptekin, Albuquerque, NM (US)

(*) Notice: Subject to any disclaimer, the term of this patent is extended or adjusted under 35 U.S.C. 154(b) by 153 days.

(21) Appl. No.: 16/870,120

(22) Filed: May 8, 2020

Related U.S. Application Data (60) Provisional application No. 62/845,434, filed on May 9, 2019.

(51) Int. Cl.
| | |
|---|---|
| A46B 15/00 | (2006.01) |
| B08B 6/00 | (2006.01) |
| A47L 7/00 | (2006.01) |
| A01K 13/00 | (2006.01) |
| A47L 13/40 | (2006.01) |
| A46B 9/08 | (2006.01) |
| A47L 9/06 | (2006.01) |

(52) U.S. Cl.
CPC ............ *A46B 15/002* (2013.01); *A01K 13/00* (2013.01); *A46B 9/08* (2013.01); *A46B 15/0097* (2013.01); *A47L 7/0057* (2013.01); *A47L 7/0066* (2013.01); *A47L 9/0693* (2013.01); *A47L 13/40* (2013.01); *B08B 6/00* (2013.01); *A46B 2200/40* (2013.01)

(58) Field of Classification Search
CPC ... A46B 15/002; A47L 7/0057; A47L 7/0066; A47L 13/40; B08B 6/00; A01K 13/00
See application file for complete search history.

(56) References Cited

U.S. PATENT DOCUMENTS

| | | | |
|---|---|---|---|
| 2008/0172809 A1* | 7/2008 | Park | A47L 13/40 15/1.52 |
| 2011/0000438 A1* | 1/2011 | Van Der Poel | A01K 13/00 119/609 |
| 2015/0257361 A1 | 9/2015 | Murphy | |

FOREIGN PATENT DOCUMENTS

| | | |
|---|---|---|
| CN | 203609386 U | 5/2014 |
| CN | 204158338 U | 2/2015 |
| CN | 204233063 U | 4/2015 |
| CN | 204560570 U | 8/2015 |
| CN | 105230522 A | 1/2016 |
| EP | 0 287 176 A1 * | 10/1988 |
| KR | 20180137750 A | 12/2018 |

OTHER PUBLICATIONS

"Corbett's electrostatic machine", Wikipedia, Aug. 29, 2019, https://wikimili.com/en/Corbett%27s_electrostatic_machine.

(Continued)

*Primary Examiner* — Randall E Chin
(74) *Attorney, Agent, or Firm* — Peacock Law P.C.; Justin R. Muehlmeyer (57) ABSTRACT

An apparatus for collecting hair and other bodily particles using static electricity. Preferably the apparatus comprises a base, a cylinder disposed on the base capable of holding a static electrical charge, a brush disposed on the base such that its bristles are in electrostatic contact with the cylinder, and a cylinder rotation device capable of rotating the cylinder against the brush. Various embodiments of the apparatus include various: numbers, orientations and shapes of brushes; securing devices; types of motors; vacuum ports; mats; and containers.

18 Claims, 6 Drawing Sheets

(56) References Cited

OTHER PUBLICATIONS

"Ionic Air Purifiers: Are Ionizers Safe for Your Air?", EnviroKlenz, https://enviroklenzairpurifiers.com/ionic-air-purifiers-safe, Apr. 5, 2019.

* cited by examiner

ELECTROSTATIC BODILY PARTICLE COLLECTION DEVICE

CROSS-REFERENCE TO RELATED APPLICATIONS

This application claims priority to and the benefit of the filing of U.S. Provisional Patent Application No. 62/845,434, entitled "Electrostatic Pet Hair Collecting Device", filed on May 9, 2019, and the specification and claims thereof are incorporated herein by reference.

BACKGROUND OF THE INVENTION

Embodiments of the present invention relate to methods and apparatuses for collecting hair or other bodily particles using static electricity.

Brushing and grooming pet animals releases loose hair from the animal. The same can be said of humans, whether engaging in their morning rituals of preparing for the day or in a professional hair salon. A brush does not collect all of the hair it separates from the body being brushed. Much of that loose hair and dander becomes airborne and is not collected on the brush. This airborne hair and dander becomes a health problem and dirties the particular environment.

Ionic air purifiers exist that "ionize" the air to charge airborne molecules. Some of these devices collect certain airborne molecules in removable plates, others do not collect the airborne molecules but simply charge them so that the molecules fall to the ground or attach to walls. None of these types of devices are powerful enough to attract and collect pet or human hair. Furthermore, all of them require electric power, commonly AC electric power from a wall outlet, which is often inconvenient for the user who may need to move around to places in an environment without access to electricity in the form of AC out of a wall outlet.

Currently available electrostatically charged brushes suffer problems that make them impractical and ineffective. In general, they employ a friction creating device within the brush itself to charge the brush. The bristles of such brushing devices point outwards from the device that creates the static electricity contained within it such that the entire device is used for brushing. This makes the brush heavy and awkward to use. It also forces the user to use that particular brush, rather than any brush they prefer.

What is needed is a hair collection device that attracts and collects airborne hair and dander for disposal, that is portable, that does not require electricity, and that is separate from the brush actually being used for the brushing so the user can use any brush they want.

BRIEF SUMMARY OF EMBODIMENTS OF THE PRESENT INVENTION

An electrostatic bodily particle collection device according to one embodiment of the present invention includes: a base; a cylinder comprising a material capable of holding a static electrical charge, the cylinder disposed on the base; at least one brush comprising bristles, each bristle comprising a first end disposed on the at least one brush and a second end opposite the first end, the at least one brush disposed on the base such that the second end of the bristles are in electrostatic contact with the cylinder; and a cylinder rotation device capable of rotating the cylinder against the at least one brush. In another embodiment, the at least one brush and the cylinder are disposed on the base such that the primary axis of the at least one brush is parallel to the primary axis of the cylinder. In another embodiment, the at least one brush and the cylinder are disposed on the base such that the primary axis of the at least one brush is angled in relation to the primary axis of the cylinder. In another embodiment, the height of said cylinder is about twelve inches to about twenty inches and the diameter of the cylinder is about three inches to about five inches. Another embodiment additionally includes at least one securing device disposed on the base to which the at least one brush can be secured. Another embodiment additionally includes at least one attachment device disposed on the at least one securing device capable of applying a force against the at least one brush to maintain electrostatic contact with the cylinder. In another embodiment, the cylinder is taller in height than the at least one brush. Another embodiment additionally includes a container disposed on the base below the at least one brush and oriented to receive bodily particles directed into it from the at least one brush. In another embodiment, the at least one brush comprises a first, second and third brush, and the at least one securing device comprises a first, second and third securing device, and the first brush is disposed on the first securing device at a first height, the second brush is disposed on the second securing device at a second height higher than the first height, and the third brush is disposed on the securing device at a third height higher than the second height. In another embodiment, the cylinder rotation device comprises a hand crank. In another embodiment, the cylinder rotation device comprises an electric motor. Another embodiment additionally includes a vacuum port disposed on the base. In another embodiment, a vacuum port is disposed on the at least one securing device. Another embodiment additionally includes a shroud at least partially surrounding the at least one brush.

Yet another embodiment additionally comprises a mat and a static electricity generator in electrical communication with the mat. In another embodiment, the static electricity generator is disposed in the base.

An electrostatic bodily particle collection device according to yet another embodiment of the present invention includes: a base; a post comprising a first end and a second end, the first end of the post disposed on the base; a cylinder comprising a material capable of holding a static electrical charge, a first end of the cylinder disposed on the base and a second end of the cylinder disposed on the second end of the post; at least one brush disposed on the post between the post and the cylinder, the brush comprising bristles, the first end of each bristle disposed on the at least one brush and the second end of each bristle opposite the first end, the at least one brush oriented in relation to the cylinder such that the second end of the bristles are capable of electrostatic contact with the cylinder, the primary axis of the at least one brush being parallel to the primary axis of the cylinder such that about the entire length of the brush is capable of electrostatic contact with the cylinder; at least one spring-loaded attachment device disposed on the post capable of applying a force to the at least one brush and against the cylinder; an electric motor disposed on the base capable of rotating the cylinder against the at least one brush; a container disposed on the base at, near or about underneath the brush capable of receiving bodily particles; and a vacuum port disposed on the base comprising a hole at, near or about underneath the brush. Another embodiment additionally includes a static charge generator disposed within the base; and a mat electrically connectable to the static charge generator.

A method of manufacturing an apparatus for collecting airborne bodily particles according to the present invention includes the steps of: providing a base on which a brush can be secured; providing a brush comprising bristles, the first end of each bristle disposed on the brush and the second end of each bristle opposite the first end; providing a cylinder disposed on the base, the cylinder comprising a material capable of holding a static electrical charge, the cylinder oriented in relation to the brush such that the second end of the bristles are capable of electrostatic contact with the cylinder; and providing a motor disposed on the base capable of rotating the cylinder such that the brush creates electrostatic charge in or on the cylinder, attracting airborne bodily particles thereto.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1 is a perspective view of a bodily particle collection device according to an embodiment of the present invention; and FIG. 2 is a side view of a bodily particle collection device according to an embodiment of the present invention;

FIG. 3 is a top view of a bodily particle collection device according to an embodiment of the present invention;

FIG. 4 is a bottom view of a bodily particle collection device according to an embodiment of the present invention;

FIG. 5 is a perspective view of a bodily particle collection device comprising a mat according to an embodiment of the present invention; and FIG. 6 is a top view of a bodily particle collection device comprising a mat according to an embodiment of the present invention.

DETAILED DESCRIPTION OF THE INVENTION

As used throughout this application, the term "bodily particles" shall be interpreted to include human or animal hair, dander and any other human or animal bodily particles. The terms "parallel" and "perpendicular" shall be interpreted as approximate references to angles and are not intended to require those angles to absolute precision but should be interpreted to include deviations from those standard meanings that still accomplish the purpose of the present invention.

Referring to the figures, particularly FIGS. 1-3, an electrostatic bodily particle collection device 10 according to an embodiment of the present invention comprises cylinder 20, brush 30, securing device 40, and base 50. To attract airborne bodily particles, embodiments of the present invention generate an electrostatic charge on cylinder 20 by rotating it against brush 30, which rotation is accomplished by cylinder rotation device 52 (one embodiment of which is illustrated in FIG. 4). The interaction of brush 30 with cylinder 20 releases negative charges (electrons) that build up on the cylinder to produce a static charge that attracts airborne bodily particles to the cylinder. In addition to creating the electrostatic charge on cylinder 20, brush 30 also collects the airborne bodily particles that have collected on cylinder 20, Brush 30 can then be removed from cylinder 20 in order to dispose of the bodily particles.

Cylinder 20 is preferably in the form of a cylinder or column, so as to be able to rotate with consistent interaction with brush 30. The particular dimensions of cylinder 20 depend on the particular application. For example, pets are generally much shorter than human adults and typically not more than about four feet tall. Accordingly, in some embodiments of the present invention intended to be used to collect bodily particles of typical household pets, the height of cylinder 20 is preferably about six inches to about forty-four inches, more preferably about ten inches to about thirty inches, and most preferably about twelve inches to about twenty inches. Preferably cylinder 20 is taller in height than brush 30, to make room for arm 43 as described more thoroughly below. The diameter of cylinder 20 affects its ability to attract bodily particles. Preferably, the diameter of cylinder 20 is between about one inch and about twenty-four inches, more preferably about two inches to about ten inches, and most preferably about three inches to about five inches. With these dimensions, electrostatic bodily particle collection device 10 can be easily moved around to wherever the pet is to be brushed while providing enough surface area to effectively attract the bodily particles released from the pet during brushing.

Embodiments for use for larger animals or humans can have larger dimensions than the embodiments for typical household pets described above. In one embodiment, the cylinder is as tall as a person. In another embodiment it extends from the floor of a hair salon to almost the ceiling. In another embodiment it is tall enough to conveniently rest on a bathroom or salon counter or table without being too unsightly or unwieldy. Accordingly, the height of the cylinder of these large animal or human embodiments are preferably about six inches to about one-hundred and twenty inches, more preferably about twelve inches to about twenty four inches, and most preferably about sixteen inches to about twenty four inches.

The quality of the electrostatic contact between brush 30 and cylinder 20 and the quality of the cylinder 20 has in attracting airborne bodily particles depends on the material of cylinder 20. Preferably, cylinder 20 is formed of or comprises a material that efficiently receives and holds electrostatic charge, including but not limited to plastics, vinyl, polyvinyl chloride (PVC), wood, rubber, brass, silver, gold, copper, polyester, fabric, foam, styrene, Styrofoam, polyurethane, polyethylene, polypropylene, silicon, Teflon, and any combination thereof, including plating with any combinations of metals.

Referring to the axis along their lengths as their "primary axis", preferably the primary axes of cylinder 20 and brush 30 are parallel to each other such that as much of the length of brush 30 interacts with the surface of cylinder 20 as possible. Cylinder 20 and brush 30 are preferably secured to base 50 so that their interaction can be controlled and consistent in relation to each other. As perhaps best illustrated in FIG. 1, brush 30 is secured to base 50 by securing device 40. The primary axis of post 42 extends parallel to the primary axes of cylinder 20 and brush 30. A first end of post 42 is secured to base 50 and the opposite second end preferably extends to a height above the height of brush 30. Brush 30 is preferably removably securable to post 42 by brush attachment devices 44. At the second end of post 42, arm 43 extends perpendicular to the axes of brush 30, post 42 and cylinder 20, extending a distance to at least span the distance between post 42 and the center of cylinder 20 to secure cylinder 20 to it. In this way brush 30 is disposed between post 42 and cylinder 20, and underneath arm 43.

To some extent, the quality of electrostatic contact is a result of the way brush 30 is secured to post 42 and disposed in relation to cylinder 20. As used through this application, the term "electrostatic contact" is not limited to direct physical contact and is not intended to require that all bristles of brush or the entirety of brush 30 be in direct physical contact at all times, but also includes electrical contact, that is, the relation in which the bristles of brush 30 can impart electrical charge on cylinder 20 whether those objects are in direct physical contact or not. Attachment devices 44 aid in managing the quality of the electrostatic contact. So that brush 30 maintains a consistent electrostatic contact with cylinder 20, brush attachment devices 44 preferably comprise springs that apply a force on brush 30 so that the brush maintains electrostatic contact with cylinder for preferably at least a portion of the length of the brush, more preferably the majority of the length of the brush and most preferably the entire length of the brush. This also aids in making it easy to remove and reattach brush 30, the spring-loaded screws providing a way to attach and remove brush 30 from securing device 40. In some embodiments, attachment devices 44 comprise clamps, bolts, screws, crimps, pins, snap-fits, shrink-fits, etc, and any combination thereof. The number and placements of attachment devices 44 depend on the length of the brush 30, the shape of brush 30, the number of brushes 30 and the desired quality of contact between brush 30 and cylinder 20. In some embodiments, there is one attachment device 44 per brush 30. In some embodiments there are a plurality of attachment devices 44 for each brush 30.

A factor in managing the quality of electrostatic contact between cylinder 20 and brush 30 involves the quality of brush 30. Preferably, brush 30 comprises bristles 32 of a material and density that is conducive to generating static electricity, including but not limited to animal hairs, synthetics, nylon, leather, fur, feathers, fabric, wool and organic materials. The term "bristles" as used throughout this application is intended to include material in the form of strips, fibers, spines, barbs, points, projections and any shape of material that is elongated with some space between each bristle. Brush 30 preferably comprises bristles 32 because bristles also serve to collect bodily particles efficiently while not causing a problematic coagulation or blockage of such bodily particles on one side of the brush. The naturally occurring space between bristles 32 allows some of the bodily particles to pass into the center of brush 30 and be collected there, distributing where the bodily particles are collected, so that not all the bodily particles collect at the side of the brush 30 into which cylinder 20 is rotating.

In some embodiments, brush 30 comprises a block of material and no bristles. Such block material is preferably shaped similar to or to coordinate with the curvature of cylinder 20. In one embodiment, brush 30 is shaped concave to the same curvature as cylinder 20. The material of brush 30 in such block embodiments is preferably a material that is easily shaped and that creates and holds static electricity, including but not limited to foam, Styrofoam, insulation, fabric, wool, etc. and any combination thereof.

Another factor in managing the quality of electrostatic contact between cylinder 20 and brush 30 involves the shape, number and orientation of brush or brushes 30. Preferably, bodily particle collection device 10 comprises a single rectangular brush 30 to maximize the area of electrostatic contact with cylinder 20, however in some embodiments, due to the particular desired shape and size of bodily particle collection device 10, there are multiple brushes 30 with different sizes. In some embodiments, the primary axis of the brush (or brushes) 30 are not parallel with the primary axis of cylinder 20, but angled in relation thereto. In such embodiments, the objective is to orient brush 30 so as to direct the bodily particles that accumulate along its side, the angle of the brush 30 directing the bodily particles in a downward direction towards base 50 where the bodily particles can be collected by another brush 30 or in a container 60. In one embodiment, container 60 is simply a removable bowl or cup-shaped tub. In another embodiment it is a disposable bag.

The direction of brush 30 also affects the functionality of the various embodiments of the present invention. For those embodiments in which brush 30 comprises bristles, brush 30 preferably points at cylinder 20. A typical brush comprises bristles 32 that on a first end are disposed on a brush handle and on a second end (opposite the first end) are free to contact other objects. The bristles 32 "point" in the direction that is from the first end at the handle to the second free end. It is the second end of bristle 32 that creates the electrostatic contact with cylinder 20, In this way, to some extent, the primary axes of bristles 32 are oriented generally perpendicular to the primary axis of cylinder 20, recognizing that bristles 32 tend to bend or point in various directions relative to each other in ways such that not all bristles 32 will be exactly perpendicular at all times. In other words, the primary axis of brush 30 is parallel to the primary axis of cylinder 20 such that bristles 32 would be angled or perpendicular to the primary axis of brush 30 and the primary axis of cylinder 20.

Embodiments of the present invention include various numbers, configurations and placements of brushes 30 and posts 42. In one embodiment, bodily particle collection device 10 comprises a plurality of rectangular brushes 30, all of which are secured to the same post 42. In another embodiment, bodily particle collection device 10 comprises a plurality of posts 42 and a plurality of brushes 30, a first brush 30 attached to the first post 42, a second brush 30 attached to a second post 42, etc.

Embodiments of the present invention also provide various locations of brushes 30 along the height of securing device 40. In one embodiment, a first brush 30 is preferably disposed on a first post 42 at a first height, a second brush 30 is preferably disposed on a second post 42 at a second height higher than the height of the first brush 30, and a third brush 30 on a third post 42 is preferably disposed on a third post 42 at a third height higher than the height of the second brush 30. The first, second and third posts 42 are preferably disposed on base 50 around cylinder 20 with cylinder 20 being at center and each of the posts 42 being at ninety degrees from each other in relation to the cylinder 20 such that their placement on the base forms a triangle in relation to each other. Other multi-post embodiments employ other configurations of posts 42. Posts 42 can also be angled in relation to each other at any angle.

Securing device 40 can take various shapes and forms. In some embodiments, post 42 is a cage, that is, a structure with at least one support disposed on base 50 and any number of arms 43 that project in various directions off of post 42 to support any number of brushes 30 and provide structural integrity to bodily particle collection device 10. In one embodiment, securing device 40 is a cylindrical cage. In another embodiment, securing device 40 is a spherical cage. In another embodiment, securing device 40 is a plastic container. In another embodiment, securing device 40 is continuous with base 50, that is, it is continuous with base 50, formed of the same material or unitary therewith.

Figure 1:
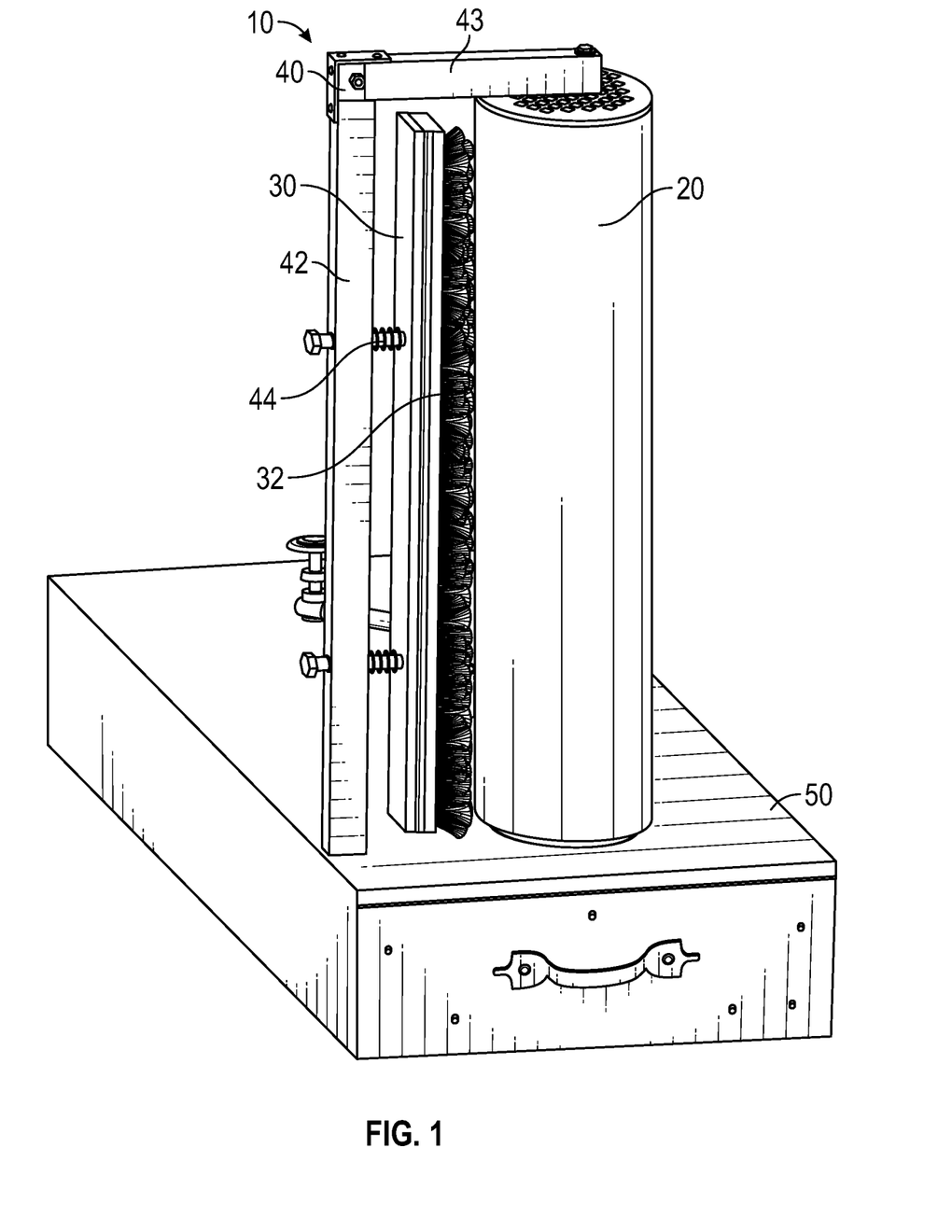
Figure 2:
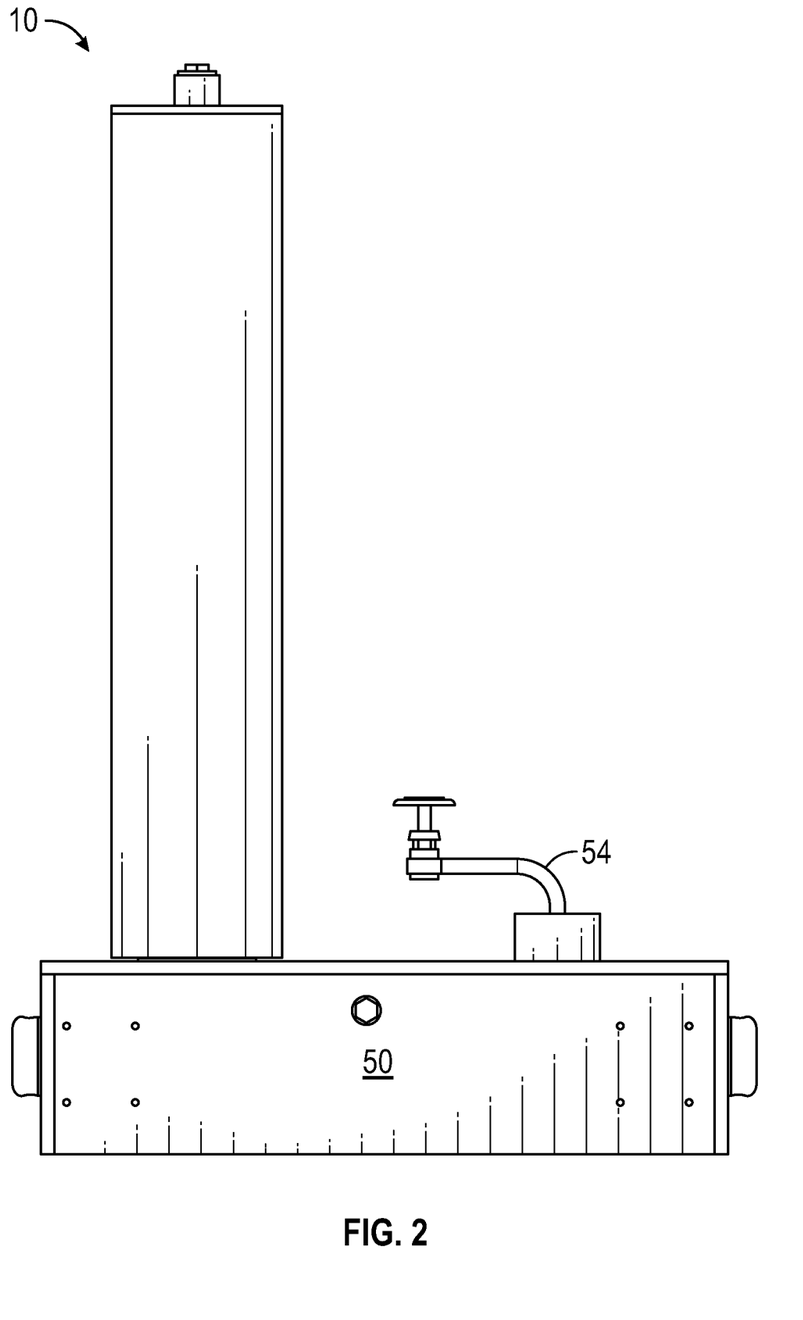
Figure 3:
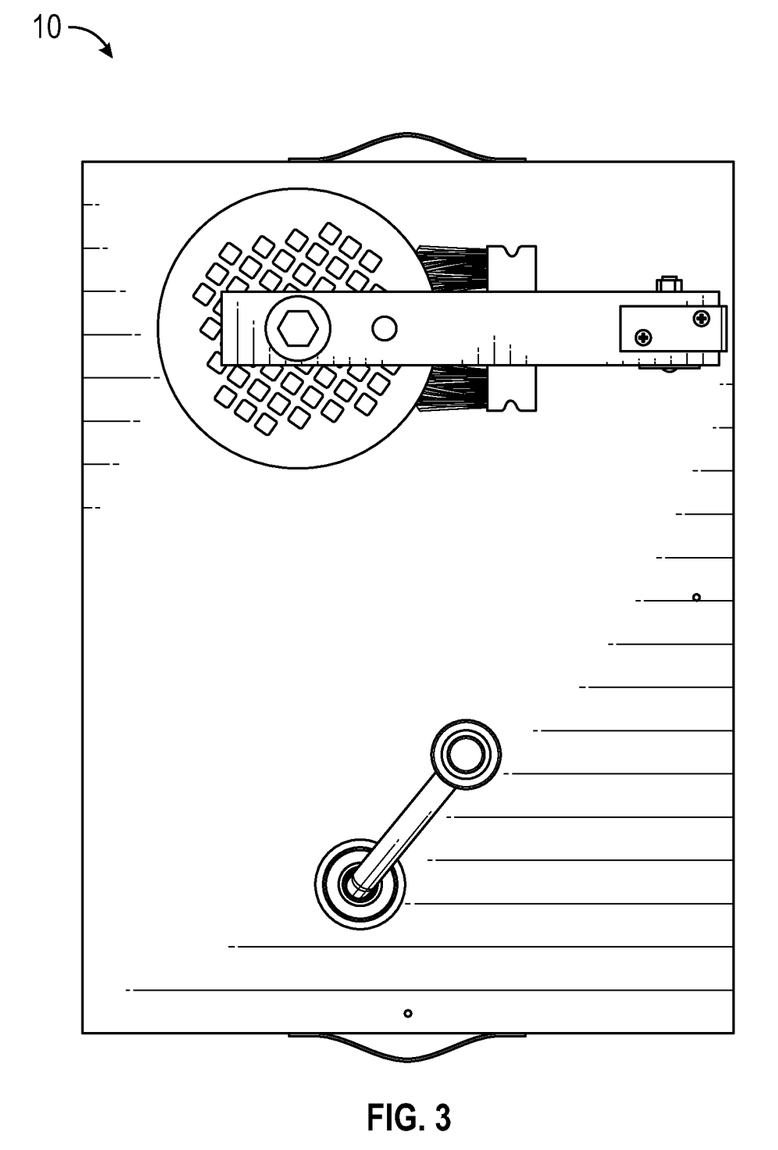
Figure 4:
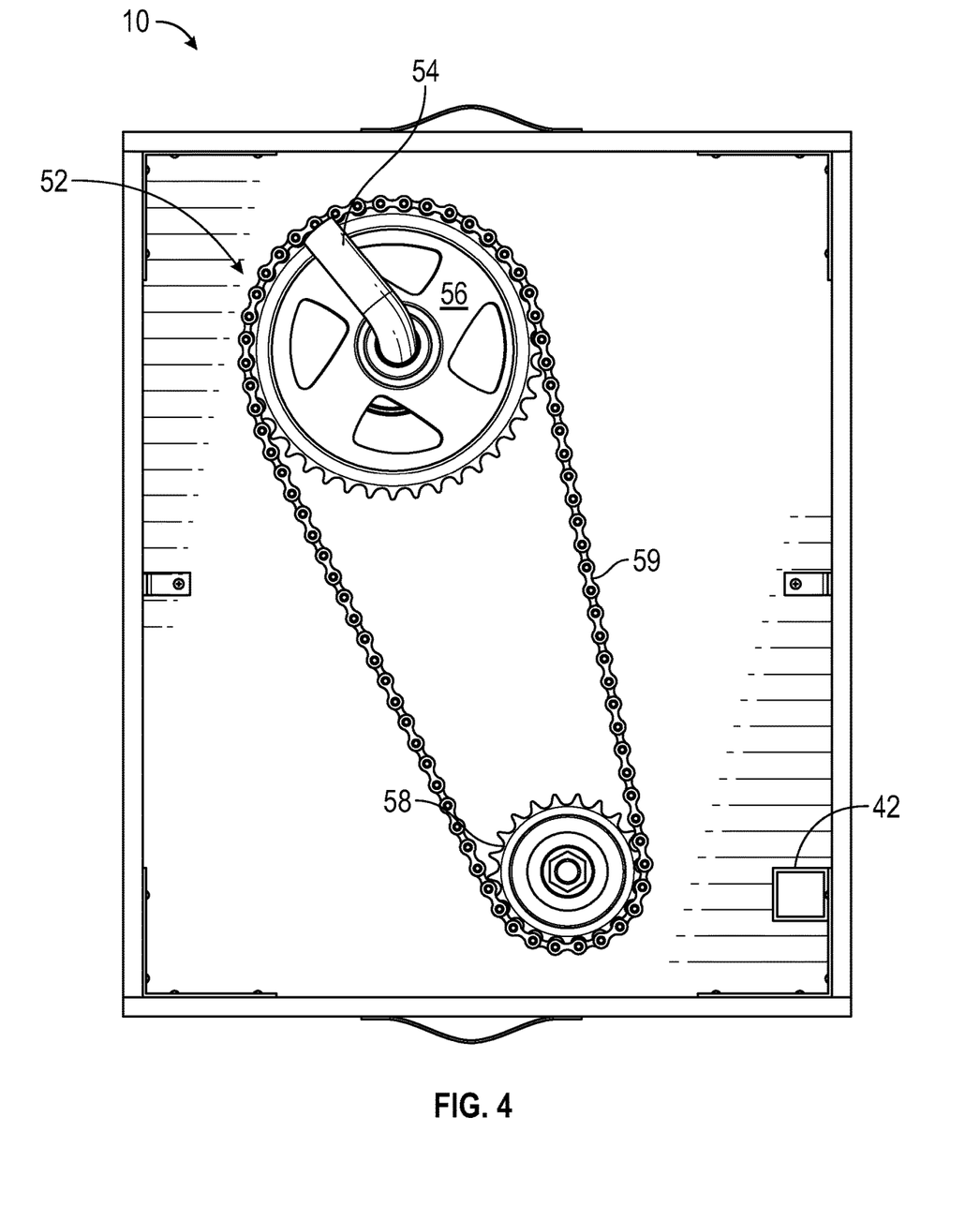

Embodiments of the present invention comprise cylinder rotation device 52 for rotating cylinder 20. There are electric and non-electric embodiments. In one non-electric embodiment illustrated in FIGS. 1-4, a hand crank system rotates cylinder 20. As perhaps best illustrated in FIG. 4, one end of the cylinder comprises a projection that extends through base 50 to its underside, on which projection is disposed cylinder sprocket 58. Base 50 further comprises a hand crank 54 that comprises a projection that extends through base 50 to its underside, on which projection is disposed crank sprocket 56. Crank sprocket 56 and cylinder sprocket 58 are mechanically joined by sprocket chain 59 such that when hand crank 54 is rotated, it drives sprocket chain 59 which rotates cylinder 20. This embodiment does not employ electricity to rotate cylinder 20 and does not comprise an electric motor, batteries, nor electric plugs. This permits users to take bodily particle collection device 10 to the pet, wherever the pet may be ultimately groomed.

In another non-electric embodiment, cylinder rotation device 52 comprises a spring motor that is wound up prior to use and that rotates cylinder 20 hands free while the user grooms the pet.

In some embodiments of the present invention, cylinder rotation device 52 comprises an electric motor powered either by batteries and/or by power from an electrical outlet. Preferably the electric motor is contained within base 50. These embodiments preferably operate continuously during grooming by the flip of a switch. In some embodiments, cylinder rotation device 52 comprises motor speed adjustments to permit the speed of rotation of cylinder 20 to be increased or decreased. Some embodiments comprise a motion sensor to automatically turn on when motion is sensed in a room.

Figure 5:
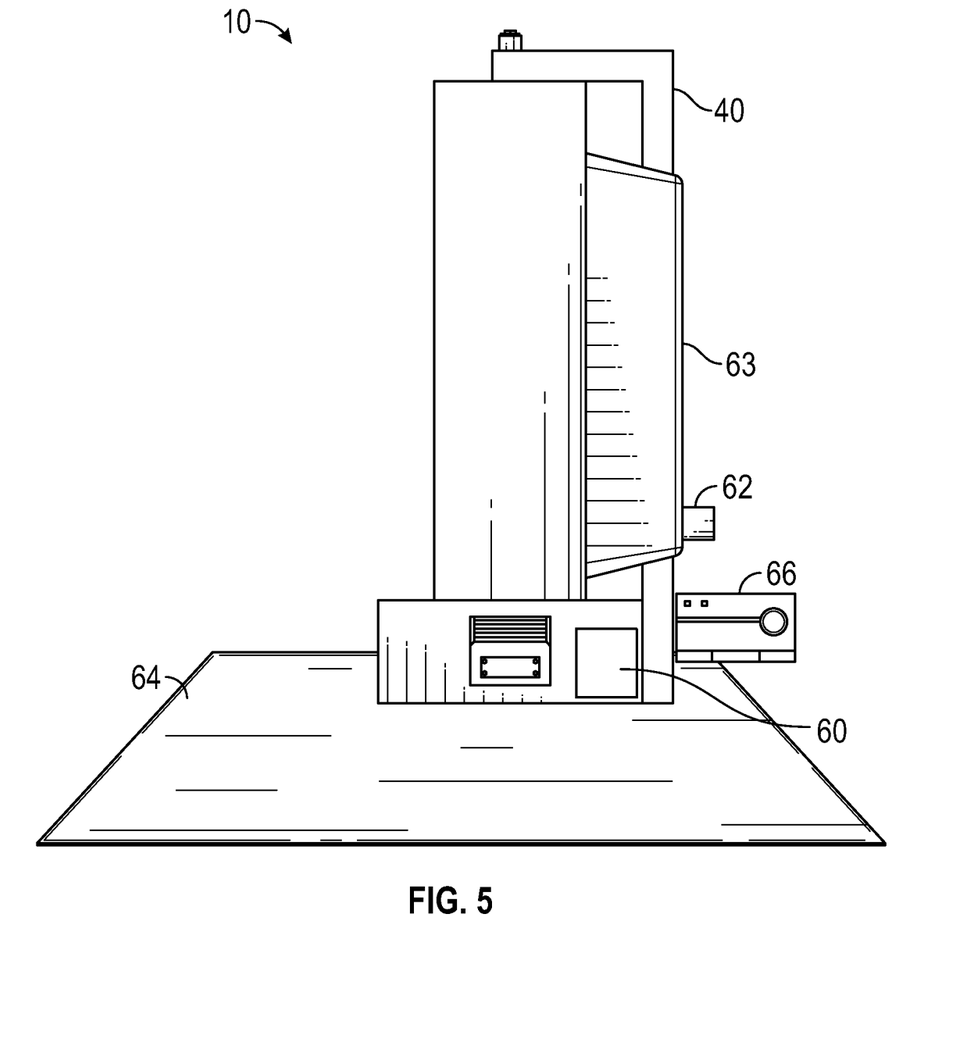

In another embodiment of the present invention, bodily particle collection device 10 comprises vacuum port 62 and shroud 63. Referring to FIG. 5, preferably shroud 63 is a material that at least partially surrounds brush 30 such that, when a vacuum coordinates with vacuum port 62, the vacuum removes bodily particles from the brush 30. Shroud 63 is preferably a material that can contain bodily particles while allowing some air to pass through, including but not limited to a material comprising fabric, polypropylene, nylon, cloth, paper, and any combination thereof. In one embodiment, vacuum port 62 comprises a first hole in an outer side of base 50 with a tube or tunnel extending through base 50 and out through a second hole disposed on the top side of base 50 at or near the bottom of brush 30. In another embodiment vacuum port 62 is on shroud 63 itself so that the user need only plug the vacuum into the shroud. In another embodiment, the second hole of vacuum port 62 is disposed in, at or near bodily particle container 60. In another embodiment, vacuum port 62 is disposed on securing device 40 and securing device 40 comprises a series of holes along its length such that bodily particles can be received in such holes when a vacuum is coordinated with the vacuum port 62.

Figure 6:
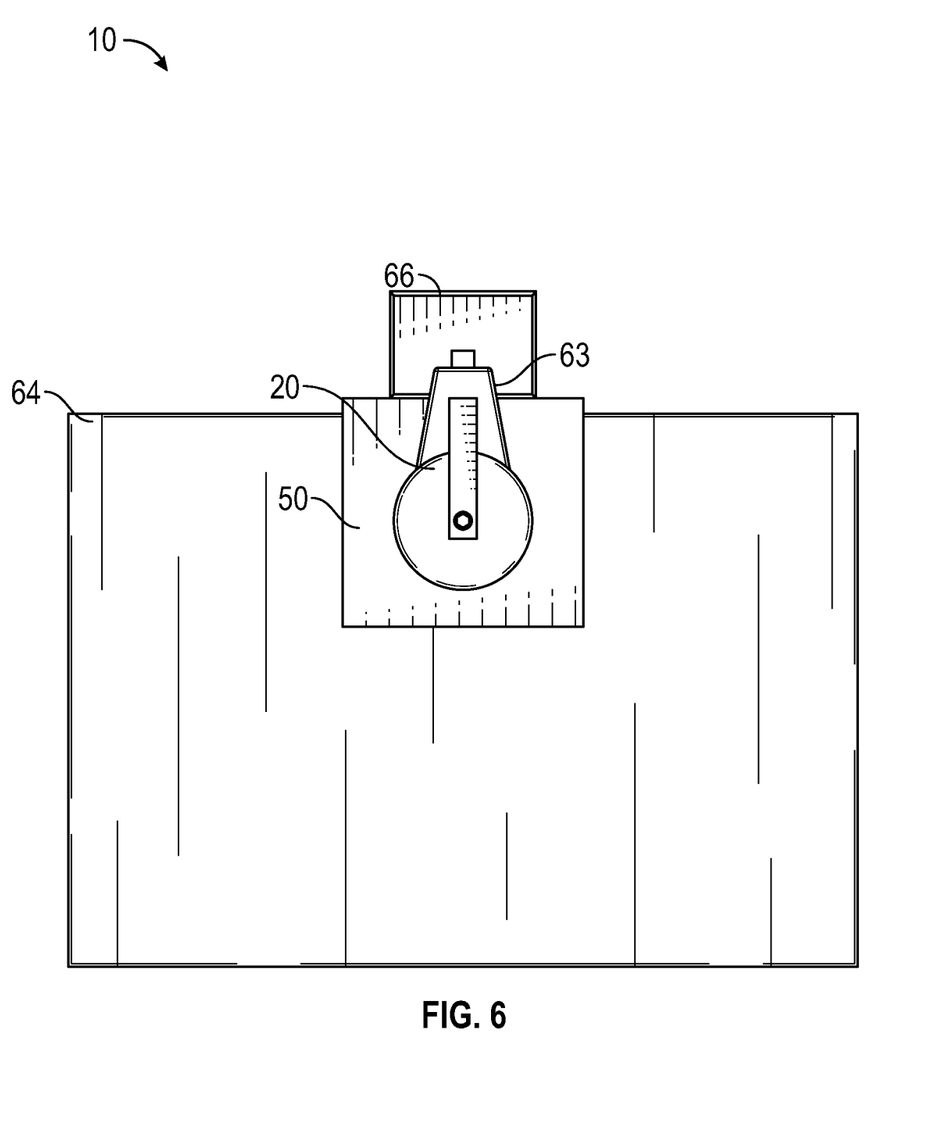

Referring to FIG. 6, embodiments of the bodily particle collection device 10 according to the present invention further comprise mat 64 for collecting bodily particles that fall to the ground or that are immediately surrounding the pet or human being brushed. Preferably, mat 64 is electrically charged. In one embodiment, a charge generator 66 is electrically connected to mat 64 and capable of generating a static electric charge that attracts bodily particles to the mat. Preferably, charge generator 66 is an electrostatic generator, including but not limited to a Van de Graaff generator. In one embodiment, charge generator 66 is disposed within base 50 so as to unify as many components of bodily particle collection device 10 in a unitary object as possible. In such case, it is preferably that mat 64 is shaped to coordinate with base 50. For example, in one embodiment, mat 64 comprises an imprint or form on mat 64 with which base 50 can coordinate comprising the requisite electrical connections directly on the mat such that the user need only line base 50 with the imprint or form to connect mat 64 to the charge generator 66. In another embodiment, no such imprint or form is needed, and charge generator 66 itself need only be placed on any portion of mat 64 to make the requisite electrical connection to charge mat 64. In another embodiment, bodily particle collection device 10 further comprises a plug and cord system to electrically connect charge generator 66 with mat 64.

Preferably, mat 64 is shaped and sized to lay flat on the ground over a surface area that at least covers the area that is directly under a typical pet or human. Preferably, mat 64 is sized about four square inches to about one hundred twenty square inches, more preferably about six square inches to about to about seventy-two square inches, and most preferably about twelve square inches to about forty-eight square inches. Preferably, mat 64 is rectangular or square, but can be of any shape. In some embodiments, mat 64 is circular.

In another embodiment, mat 64 is preferably charged using a cloth that would be wiped across the surface generating a static electric charge that attracts bodily particles to the mat, instead of charge generator 66.

EXAMPLES

The invention is further illustrated by the following non-limiting example.

An electrostatic pet hair collection apparatus was constructed comprising a cylinder, a base, a post, a brush and a crank system for rotating the cylinder. A first end of the post was disposed on the base and the second end of the post had an arm extending out from the post at about a perpendicular angle and for a length of about 5 inches. The length of the post from the base to the arm was about 21 inches. The cylinder comprised PVC material and had a height of about two inches less than the height of the post. Its diameter was about 4 inches, such that the arm of the post extended from the post to the center of the cylinder with the brush disposed between the post and cylinder. A first end of the cylinder was disposed on the base and had a projection extending through the base to the cavity in the underside of the base. The projection coordinated with a sprocket so that the cylinder could be rotated. The second end of the cylinder was secured to the arm of the post. The brush was removably secured to the post between the post and the cylinder, by spring-loaded screws so that the brush maintained electrostatic contact with the cylinder or at least maintained direct physical contact with if. The base comprised a hand crank that on the top side of the base had a handle, and on the underside of the base had a sprocket attached to the crank. The sprocket of the crank and the sprocket of the cylinder were coordinated by a sprocket chain such that when the crank was cranked, the cylinder rotated.

The aforementioned example of an apparatus was used to collect the hair of a pet animal being brushed. A groomer either placed the electrostatic pet hair collection device near the pet being brushed or brought the pet in its vicinity. As the groomer brushed the pet, the pet's hair became airborne. The groomer either used the pet hair collection device occasionally during the grooming or waited until the end of the grooming. To use it, the groomer cranked the crank to rotate the cylinder. As the cylinder rotated, the brush created an electrostatic charge on the cylinder that attracted the airborne hair to the cylinder. That hair collected on the cylinder, which then collected on the brush as the cylinder rotated against the brush. Once the brush either collected enough hair or the groomer was done grooming, the groomer removed the brush from the electrostatic pet hair collection device by loosening the spring-loaded screws and removing the brush away from the post. The groomer then disposed of the hair collected on the brush elsewhere. The groomer then reattached the brush to the post using the spring-loaded screws for reuse.

The preceding examples can be repeated with similar success by substituting the generically or specifically described components and/or operating conditions of embodiments of the present invention for those used in the preceding examples.

Note that in the specification and claims, "about" or "approximately" means within twenty percent (20%) of the numerical amount cited.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. An electrostatic bodily particle collection device comprising:
　a base;
　a cylinder comprising a material capable of holding a static electrical charge, the cylinder disposed on the base;
　at least one brush comprising bristles, each bristle comprising a first end disposed on the at least one brush and a second end opposite the first end, the at least one brush disposed on the base such that the second end of the bristles are in electrostatic contact with the cylinder; and
　a cylinder rotation device capable of rotating the cylinder against the at least one brush;
　at least one securing device disposed on the base to which the at least one brush can be secured; and
　at least one attachment device disposed on the at least one securing device capable of applying a force against the at least one brush to maintain electrostatic contact with the cylinder.

2. The electrostatic bodily particle collection device of claim 1 wherein the at least one brush and the cylinder are disposed on the base such that the primary axis of the at least one brush is parallel to the primary axis of the cylinder.

3. The electrostatic bodily particle collection device of claim 1 wherein the at least one brush and the cylinder are disposed on the base such that the primary axis of the at least one brush is angled in relation to the primary axis of the cylinder.

4. The electrostatic bodily particle collection device of claim 1 wherein the height of said cylinder is about twelve inches to about twenty inches and the diameter of the cylinder is about three inches to about five inches.

5. The electrostatic bodily particle collection device of claim 1 wherein the cylinder is taller in height than the at least one brush.

6. The electrostatic bodily particle collection device of claim 1 further comprising a container disposed on the base below the at least one brush and oriented to receive bodily particles directed into it from the at least one brush.

7. The electrostatic bodily particle collection device of claim 1 wherein the at least one brush comprises a first, second and third brush, and the at least one securing device comprises a first, second and third securing device, wherein the first brush is disposed on the first securing device at a first height, the second brush is disposed on the second securing device at a second height higher than the first height, and the third brush is disposed on the securing device at a third height higher than the second height.

8. The electrostatic bodily particle collection device of claim 1 wherein the cylinder rotation device comprises a hand crank.

9. The electrostatic bodily particle collection device of claim 1 wherein the cylinder rotation device comprises an electric motor.

10. The electrostatic bodily particle collection device of claim 1 further comprising a vacuum port disposed on the base.

11. The electrostatic bodily particle collection device of claim 1 further comprising a vacuum port disposed on the at least one securing device.

12. The electrostatic bodily particle collection device of claim 1 further comprising a shroud at least partially surrounding the at least one brush.

13. The electrostatic bodily particle collection device of claim 1 further comprising a mat.

14. The electrostatic bodily particle collection device of claim 13 further comprising a static electricity generator in electrical communication with the mat.

15. The electrostatic bodily particle collection device of claim 14 wherein the static electricity generator is disposed in the base.

16. An electrostatic bodily particle collection device comprising:
　a base;
　a post comprising a first end and a second end, the first end of the post disposed on the base;
　a cylinder comprising a material capable of holding a static electrical charge, a first end of the cylinder disposed on the base and a second end of the cylinder disposed on the second end of the post;
　at least one brush disposed on the post between the post and the cylinder, the brush comprising bristles, the first end of each bristle disposed on the at least one brush and the second end of each bristle opposite the first end, the at least one brush oriented in relation to the cylinder such that the second end of the bristles are capable of electrostatic contact with the cylinder, the primary axis of the at least one brush being parallel to the primary axis of the cylinder such that about the entire length of the brush is capable of electrostatic contact with the cylinder;

at least one spring-loaded attachment device disposed on the post capable of applying a force to the at least one brush and against the cylinder;

an electric motor disposed on the base capable of rotating the cylinder against the at least one brush;

a container disposed on the base at, near or about underneath the brush capable of receiving bodily particles; and a vacuum port disposed on the base comprising a hole at, near or about underneath the brush.

17. The electrostatic bodily particle collection device of claim 16 further comprising:

a static charge generator disposed within the base; and a mat electrically connectable to the static charge generator.

18. A method of manufacturing an apparatus for collecting airborne bodily particles comprising the steps of:

providing a base on which a brush can be secured;

providing a brush comprising bristles, the first end of each bristle disposed on the brush and the second end of each bristle opposite the first end;

providing a cylinder disposed on the base, the cylinder comprising a material capable of holding a static electrical charge, the cylinder oriented in relation to the brush such that the second end of the bristles are capable of electrostatic contact with the cylinder;

providing a securing device disposed on the base to which the brush can be secured;

providing an attachment device disposed on the securing device capable of applying a force against the brush to maintain electrostatic contact with the cylinder; and providing a rotation device disposed on the base capable of rotating the cylinder such that the brush creates electrostatic charge in or on the cylinder, attracting airborne bodily particles thereto.

* * * * *